United States Patent [19]

Hutter, III

[11] Patent Number: 4,842,912

[45] Date of Patent: Jun. 27, 1989

[54] ADHESIVE ATTACHMENT AND MOUNTING FIXTURE

[75] Inventor: Charles G. Hutter, III, Carson City, Nebr.

[73] Assignee: Physical Systems, Inc., Carson City, Nebr.

[21] Appl. No.: 153,337

[22] Filed: Feb. 8, 1988

Related U.S. Application Data

[63] Continuation of Ser. No. 863,620, May 15, 1986, Pat. No. 4,778,702, which is a continuation-in-part of Ser. No. 772,610, Sep. 4, 1985, Pat. No. 4,668,546.

[51] Int. Cl.$^4$ .......................... B32B 1/00; B32B 7/06
[52] U.S. Cl. ........................................ 428/65; 156/71;
156/91; 156/247; 156/344; 248/205.3; 428/99
[58] Field of Search .................... 24/304, DIG. 11;
156/71, 91, 247, 344; 248/205.3, 205.4, 205.5, 205.6; 428/40, 64, 65, 99, 174, 343

[56] References Cited

U.S. PATENT DOCUMENTS

| 2,092,341 | 9/1937  | De Vries .              |
|-----------|---------|-------------------------|
| 2,451,194 | 10/1948 | Braun ............... 248/205 A |
| 2,557,434 | 6/1951  | Hoverder ............ 248/205 A |
| 2,987,098 | 6/1961  | Daniel ................ 156/94 X |
| 3,236,715 | 2/1966  | Gunderson .             |
| 3,661,683 | 5/1972  | Engel et al. ......... 156/94 X |
| 3,837,965 | 9/1974  | Mahon et al. ......... 156/382 |
| 3,885,768 | 5/1975  | Frye ..................... 248/467 |
| 3,996,082 | 12/1976 | Leatherman .            |
| 4,025,677 | 5/1977  | Belke .................... 428/63 |
| 4,167,259 | 9/1979  | Bury .................. 248/205 A |
| 4,302,492 | 11/1981 | Hutter .                 |
| 4,338,151 | 7/1982  | Hutter .                 |
| 4,390,576 | 6/1983  | Hutter .                 |
| 4,556,439 | 12/1985 | Bannink, Jr. .           |

FOREIGN PATENT DOCUMENTS 1418483 12/1975 United Kingdom .
1468030  3/1977 United Kingdom .

Primary Examiner—Robert A. Dawson
Attorney, Agent, or Firm—Kelly, Bauersfeld & Lowry

[57] ABSTRACT

Improved adhesive attachments and related mounting fixtures and methods are provided for secure mounting of an adhesive attachment to a substrate. In one preferred form, the adhesive attachment comprises an enlarged attachment base locked in sandwiched relation between multiple laminations of prebonded composite material to define an enlarged composite footplate with an extended composite material surface for secure bonding onto a substrate of composite material. The attachment is pressed against the substrate with an appropriate bonding agent at the attachment/substrate interface by a mounting fixture which is connected at least temporarily to the substrate and includes a spring member applying a positive force pressing the attachment toward the substrate. Alternative adhesive attachments formed from multiple components are also disclosed.

7 Claims, 5 Drawing Sheets

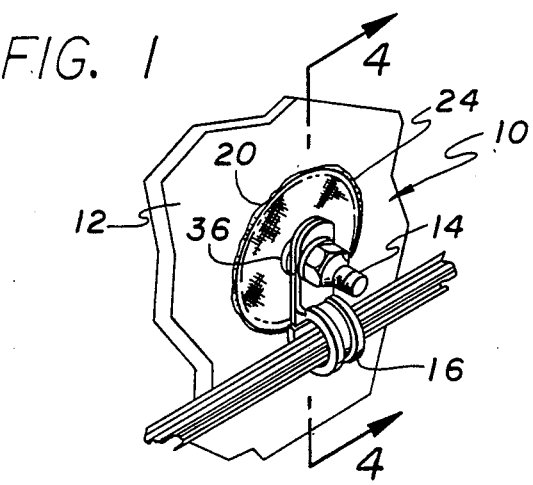
FIG. 1
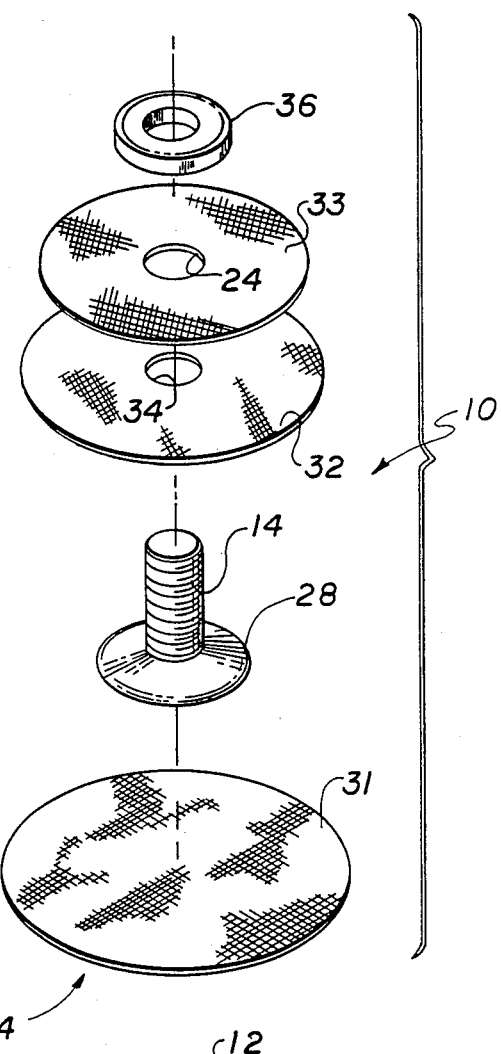
FIG. 2
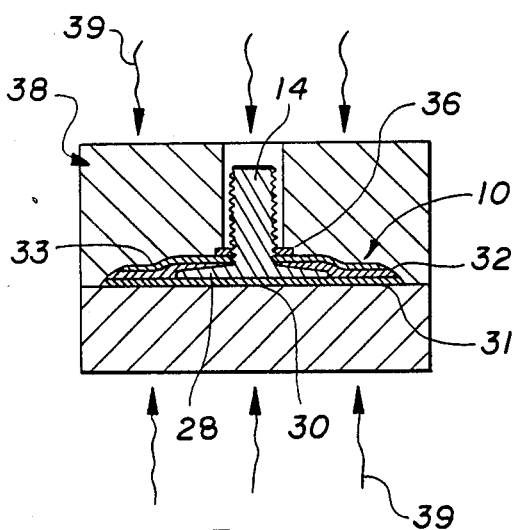
FIG. 3
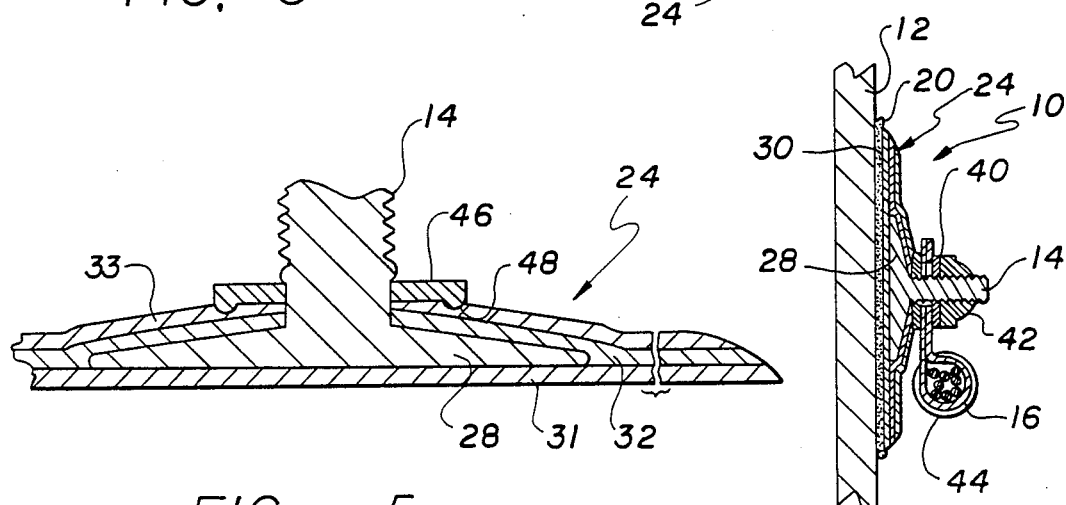
FIG. 5
FIG. 4

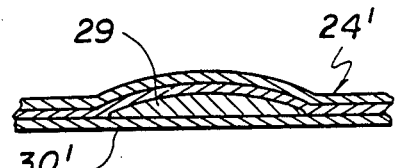
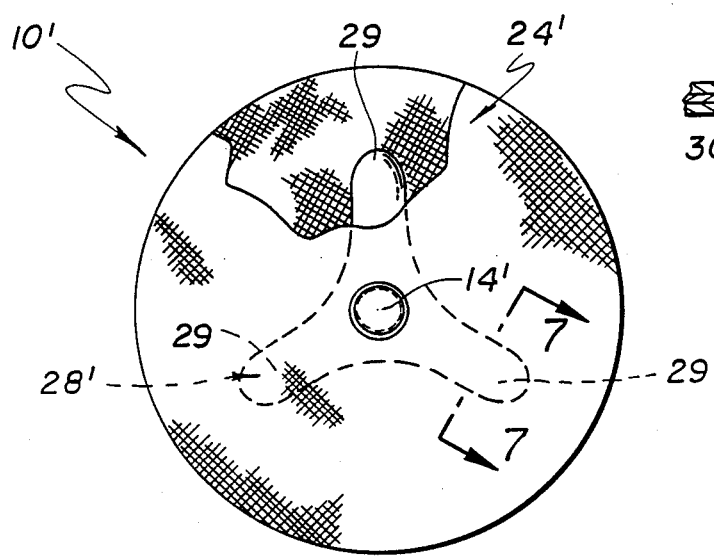
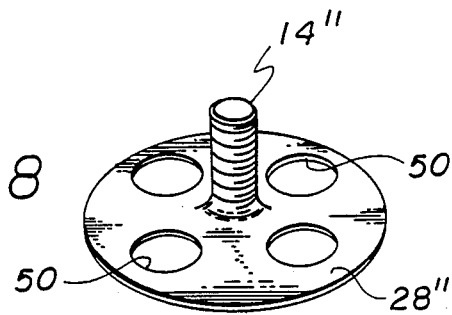
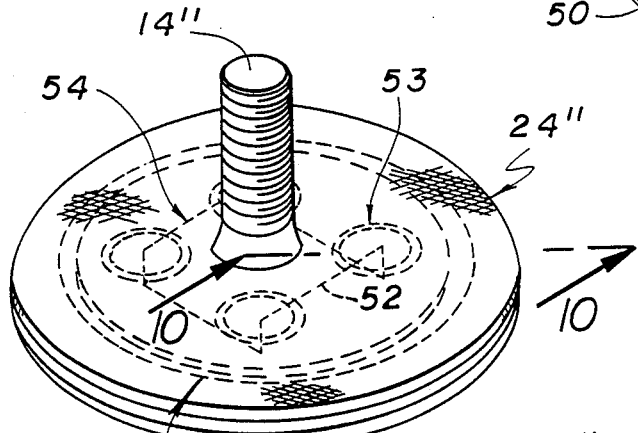
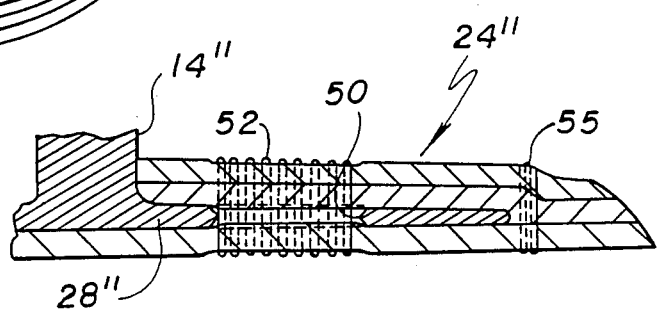

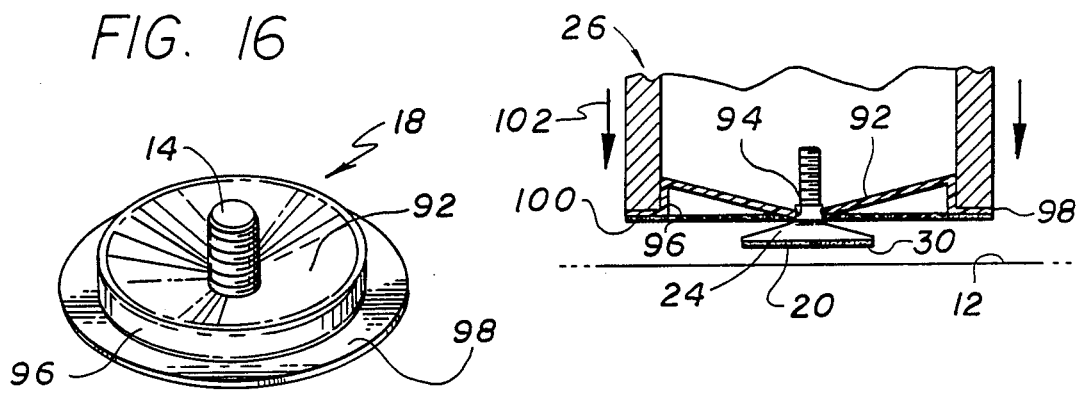
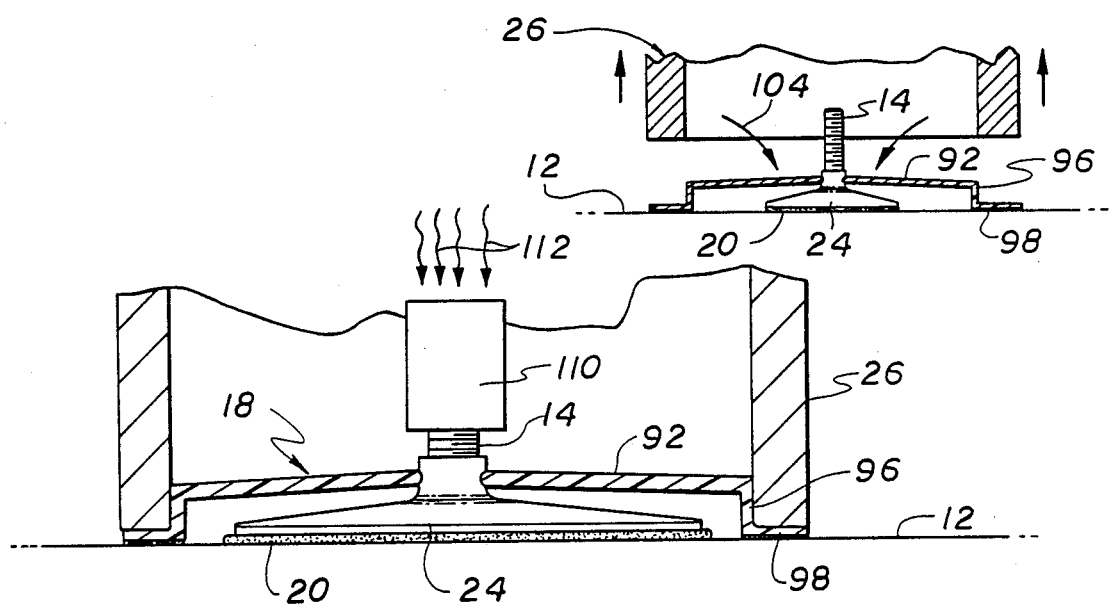
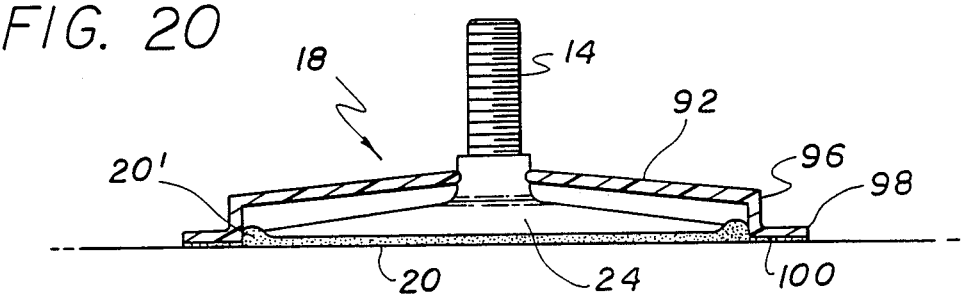

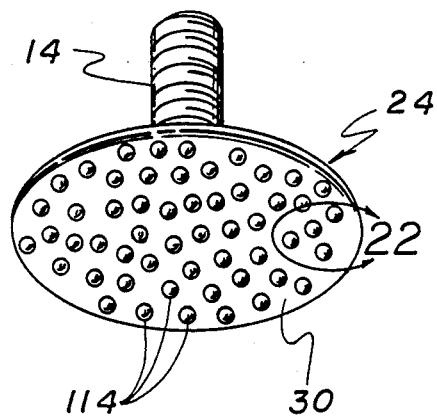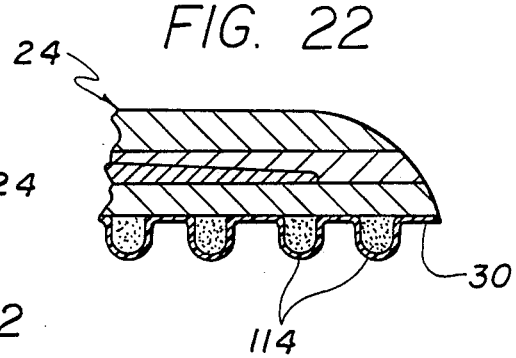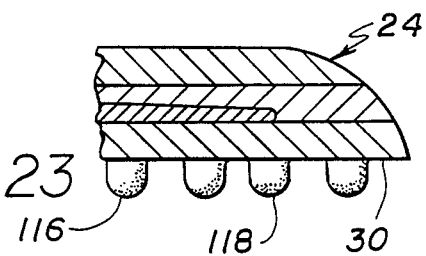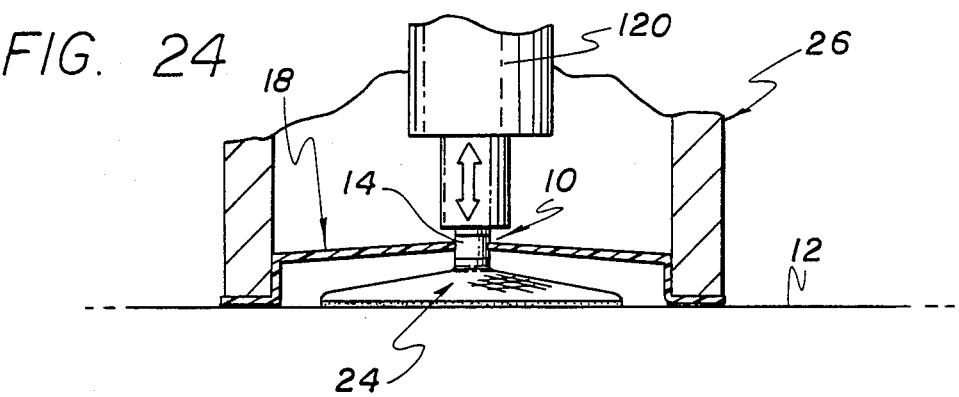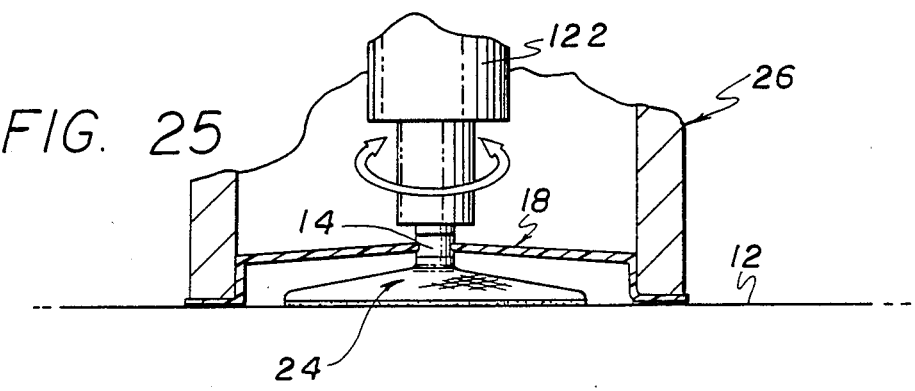

ADHESIVE ATTACHMENT AND MOUNTING FIXTURE

This is a continuation of application Ser. No. 863,620, filed May 15, 1986, now U.S. Pat. No. 4,778,702, which in turn is a continuation-in-part of copending application Ser. no. 772,610, filed Sept. 4, 1985, now U.S. Pat. No. 4,668,546, and entitled Fixture for Securing an Adhesive Attachment to a substrate.

BACKGROUND OF THE INVENTION

This invention relates generally to adhesive attachment assemblies including adhesive attachments or the like and mounting fixtures and related methods of use for securing an adhesive attachment onto a supporting surface or substrate. More specifically, this invention relates to improvements in such adhesive attachments and mounting fixtures particularly of the types described and claimed in commonly assigned U.S. Pat. Nos. 4,302,492; 4,338,151; and 4,390,576.

In many instances, it is necessary or desirable to install an element such as a patch, threaded screw stud, or the like onto a supporting substrate by means of an adhesive connection or bond. For example, it may be necessary to apply a thin patch to the skin of an aircraft or the hull of a boat or other structure to repair a hole therein. Alternately, it may be desirable to mount a threaded screw stud or other device onto a substrate such as the windshield of an automobile or the like without forming a hole within the substrate. As another alternative, in many modern aerospace applications, it is frequently desirable to attach a threaded stud or patch or other device onto a nonmetallic substrate formed from composite materials or the like without forming a mounting hole or otherwise interrupting the surface of the substrate. As one such example, it is known to attach a threaded stud onto a composite material substrate, wherein the stud supports a conventional cable clamp through which a bundle of electrical conductor wires or the like is threaded. To achieve a maximum strength bond of the adhesive attachment to the substrate, it is desirable to apply a positive force pressing the attachment against the substrate during at least an initial time period for curing of a selected bonding agent at the attachment/substrate interface.

In the past, a variety of fixture devices have been proposed for use in temporarily supporting an adhesive attachment upon the surface of a substrate during the cure time of a bonding agent at the attachment/substrate interface. In general, these fixture devices have required some form of mechanical connection to the substrate by means of screws or other mechanical fasteners such as clamping jaws, etc. However, such devices are not well suited for use with substrates having extended surface areas lacking surface interruptions such as threaded holes or edges for mechanical engagement by the fixture device. Moreover, such fixture devices are not adapted for use with substrates formed from relatively fragile or thin-walled materials incapable of withstanding localized stress attributable to the fixture device.

Other types of fixturing devices have been proposed using suction cups for supporting an attachment upon a substrate during the cure time of a bonding agent. However, such suction cup devices are inherently restricted to use with relatively smooth-finished substrates and further are generally ineffective to exert any significant positive force urging the attachment toward the substrate. Still other fixturing devices have utilized inflatable air bags or bladders held adhesively onto the substrate during bonding agent cure time to press against the adhesive attachment. However, such flexible air bags have inadequate structural integrity to apply uniform positive force to the adhesive attachment, resulting in uneven distribution of the bonding agent at the attachment/substrate interface and/or curing of the bonding agent with less than full bonding strength.

Improved fixturing devices for mounting adhesive attachments are described and claimed in commonly assigned U.S. Pat. Nos. 4,302,492; 4,338,151; and 4,390,576. More particularly, the adhesive attachments described in these patents are carried by mounting fixtures designed for temporary securement to the substrate by means of a pressure sensitive adhesive or the like. The support fixtures include force-bias or spring means activated when the fixtures are mounted on the substrate to apply a positive force urging an attachment into positive bearing engagement with the substrate. In the specific embodiments, the force-bias or spring means includes a movable component adapted to displace the adhesive attachment from a first position carried substantially out of bearing engagement with the substrate to a second position with the attachment pressed positively against the substrate. An over-center type spring plate constitutes the movable component in most of the described embodiments. Further improved mounting fixtures of one-piece molded plastic and including means for maintaining alignment during movement into bearing engagement with the substrate are disclosed in the above-referenced copending application Ser. No. 772,610.

The present invention relates to further improvements in adhesive attachments and mounting fixtures therefor. More specifically, the present invention relates to improved adhesive attachments formed from multiple components for use in specialized substrate environments, for example, for secure bonding onto substrates formed from composite materials. In addition, the present invention relates to further improvements and simplifications in adhesive attachment mounting fixtures and their related methods of use for quickly and easily installing adhesive attachments onto a substrate.

SUMMARY OF THE INVENTION

In accordance with the invention, improved adhesive attachments and related mounting fixtures and their methods of use are provided for quickly and easily installing an adhesive attachment onto the surface of a selected substrate. The adhesive attachments of the invention are designed to include an attachment footplate constructed for substantially optimum bonding onto substrates formed from specialized materials, particularly such as composite materials. The attachments may be installed quickly and easily by use of a simplified mounting fixture which is connected at least temporarily to the substrate and applies a positive force for pressing the attachment into intimate contact with the substrate during the cure time of a bonding agent at the attachment/substrate interface.

In one preferred form of the invention, the adhesive attachment comprises a threaded stud or other device having an enlarged base for mounting onto the substrate. The enlarged base is substantially encased within a disk-shaped footplate defined by multiple laminations of one or more composite materials prebonded to the base and to each other under controlled conditions. The thus-formed composite material footplate defines an extended and uninterrupted underside surface of composite material adapted for secure bonding onto a substrate of similar composite material or the like by means of an appropriate bonding agent at the attachment/substrate interface. The footplate thus securely anchors the attachment device with respect to the substrate.

In alternative preferred forms of the invention, the enlarged base of the attachment device may be constructed with an irregular or discontinuous geometry for enhanced mechanical interlocking with the sandwiching laminations of composite material. Additionally, openings may be formed through the base with opposing laminations of composite material being connected together through said openings for further enhanced mechanical interlock between the footplate and base. Stitching of composite or similar materials may also be passed through said openings and/or used to interconnect overlapping outer peripheral regions of the composite laminations for improved connection therebetween.

In other alternative forms of the invention, the adhesive attachment comprises a threaded stud or other attachment device connected to an enlarged base of different material. In one form, the base material can be selected and shaped for enhanced matching with the mechanical characteristics of the substrate, such as the flexural characteristics and the like. In other forms, the attachment base of different material may be constructed from a composite material or encased within sandwiching laminations of composite material defining a composite footplate.

An improved mounting fixture of simplified construction includes a dished central spring member or spring plate for carrying the adhesive attachment. A connector rim at the periphery of the spring member carries adhesive means for at least temporary connection thereof onto the substrate. An installation tool supports the fixture for facilitated placement of the fixture and the attachment onto the substrate.

In use, the adhesive attachment assembly including the attachment and mounting fixture are displaced by the installation tool toward the substrate, with the spring member disposed in an unstressed or normal position. In this position, the fixture carries the adhesive attachment in a position leading the connector rim for placing the attachment onto the substrate prior to the connector rim. Further advancement of the installation tool toward the substrate applies a force acting through the attachment to deflect the spring member to a secondary, stressed position while the installation tool moves the fixture connector rim to at least temporary adhesive securement onto the substrate. Such securement of the connector rim functions to maintain the spring member in the secondary, stressed position wherein the spring member applies a positive force pressing the attachment toward the substrate for optimum bonding strength of a selected bonding agent at the attachment/substrate interface. The installation tool may include heat input means, vibratory means, or rotational means for activating the selected bonding agent concurrently with attachment placement onto the substrate.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a fragmented perspective view illustrating an improved adhesive attachment embodying the novel features of the invention and depicting the attachment bonded onto a substrate;

FIG. 2 is an exploded perspective view illustrating assembly of the adhesive attachment of FIG. 1;

FIG. 3 is a somewhat schematic vertical sectional view illustrating one method of formation of the adhesive attachment of FIG. 1;

FIG. 4 is an enlarged fragmented vertical sectional view taken generally on the line 4—4 of FIG. 1;

FIG. 5 is an enlarged fragmented vertical sectional view similar to a portion of FIG. 3 and illustrating one alternative form of the adhesive attachment;

FIG. 6 is a top plan view illustrating another alternative form of the adhesive attachment, with portions broken away to illustrate construction details thereof;

FIG. 7 is an enlarged fragmented vertical sectional view taken generally on the line 7—7 of FIG. 6;

FIG. 8 is a perspective view illustrating a threaded stud attachment device for use in another alternative form of the invention;

FIG. 9 is a perspective view illustrating the threaded stud attachment device of FIG. 8 incorporated into the alternative adhesive attachment;

FIG. 10 is an enlarged fragmented vertical sectional view taken generally on the line 10—10 of FIG. 9;

FIG. 16 is a perspective view illustrating an adhesive attachment assembly including an improved mounting fixture for use in the installation of an adhesive attachment;

FIG. 17 is a somewhat schematic diagram depicting use of the mounting fixture of FIG. 16 and an associated installation tool for mounting an adhesive attachment onto a substrate;

FIG. 18 is a schematic diagram similar to FIG. 17 but showing the adhesive attachment assembly mounted upon the substrate;

FIG. 19 is an enlarged schematic diagram similar to FIG. 17 and depicting a modified installation tool for use with a hot melt adhesive at the attachment/substrate interface;

FIG. 20 is another schematic diagram similar to FIG. 17 but illustrating permanent attachment of the adhesive attachment assembly onto a substrate;

FIG. 21 is an enlarged perspective and somewhat diagrammatic view illustrating an adhesive attachment having an encapsulated bonding agent on the underside thereof;

FIG. 22 is an enlarged fragmented sectional and somewhat diagrammatic view generally corresponding with the encircled region 22 of FIG. 21;

FIG. 23 is an enlarged fragmented sectional and somewhat diagrammatic view similar to FIG. 22 but illustrating use of an alternative bonding agent;

FIG. 24 is a schematic diagram similar to FIG. 19 and illustrating another modified installation tool including vibratory means for activating a bonding agent; and FIG. 25 is a schematic diagram similar to FIG. 19 depicting still another modified installation tool having rotational means for activating a bonding agent.

DETAILED DESCRIPTION OF THE PREFERRED EMBODIMENTS

Figure 11:
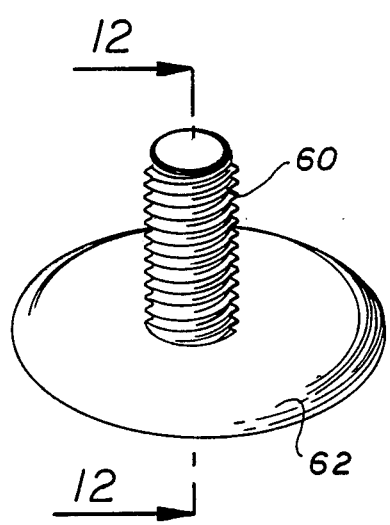
FIG. 11 is a perspective view illustrating a further alternative adhesive attachment embodying the features of the invention.
Figure 12:
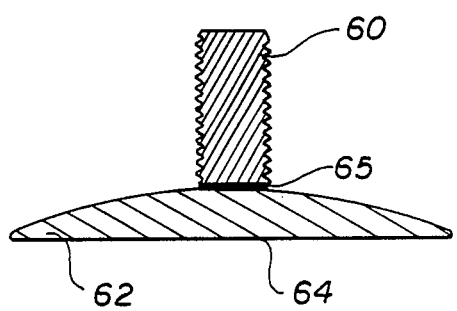
FIG. 12 is a vertical sectional view taken generally on the line 12—12 of FIG. 11.

As shown in the exemplary drawings, one preferred form of an improved adhesive attachment is referred to generally by the reference numeral 10 in FIGS. 1-4. The adhesive attachment 10 is designed for substantially optimum strength bonding onto the surface of a substrate 12 without requiring interruption of the substrate surface. The illustrative adhesive attachment 10 includes a threaded stud 14 to permit mounting of a cable clamp 16 with respect to the substrate 12, although other types of attachment devices such as a patch or the like may be provided for other purposes. A simplified mounting fixture shown in one preferred form in FIGS. 16-20 is provided for supporting the adhesive attachment 10 at least temporarily upon the substrate 12 while applying a positive force pressing the adhesive attachment against the substrate during the cure time of a bonding agent 20 at the attachment/substrate interface.

The improved adhesive attachments and mounting fixtures and related methods of use of the present invention comprise simplified and/or improved devices in relation to the adhesive attachments and mounting fixtures described and claimed in commonly assigned U.S. Pat. Nos. 4,302,492; 4,338,151; and 4,390,576. More specifically, the improved adhesive attachments of the present invention are adapted for achieving substantially optimum bonding strength connection to the uninterrupted surface of a substrate 12, particularly in specialized environments wherein the substrate is formed from a material which is generally incompatible with high strength bonding to certain types of attachment devices. For example, particularly in modern aerospace applications, the substrate may be constructed from a heat and pressure-formed network of nonmetallic composite materials such as a matrix of epoxy, plastic, glass, and/or carbon-based materials with which a high strength adhesively bonded connection to a metal threaded stud (FIG.1) or other metal attachment device is difficult to obtain. The present invention overcomes these problems by providing a high strength bonded and mechanical interlock between an enlarged footplate 24 of composite material and the metal attachment device such as the stud 14. This footplate-attachment device subcombination can be constructed advantageously under controlled production conditions with relatively high heat and pressure, as required, and the footplate thereafter bonded with high strength to the composite material substrate. As a result, a high strength connection is achieved between the metal stud 14 or the like and the composite material substrate 12. Alternative preferred forms of the invention depicted in FIGS. 11-15 provide alternative means for connecting an attachment device securely onto an enlarged footplate prior to bonding of the footplate onto a substrate.

The improved mounting fixture 18 is adapted for use with attachment devices of various construction for applying a positive force pressing the attachment device and/or its footplate toward the substrate during the cure time of a selected bonding agent at the attachment/substrate interface. The positive force is applied to the attachment incident to at least temporary connection of the mounting fixture onto the substrate. An installation tool 26 is advantageously provided for rapid placement of the mounting fixture and attachment onto the substrate. The installation tool may include means for activating a selected bonding agent at the attachment/substrate interface at the time of attachment placement.

The illustrative improved adhesive attachment 10 shown in FIGS. 1-4 comprises a selected attachment device in the form of the threaded metal stud 14 or other suitable attachment device formed integrally with an enlarged, relatively thin base 28 of generally disk-shaped configuration. This stud 14 and base 28 may be formed from a wide range of different materials, such as, for example, a lightweight titanium alloy of the type used for a variety of fasteners in aerospace environments. The enlarged base 28 is bonded and mechanically encased within the enlarged footplate 24, also having a generally disk-shaped configuration. The footplate 24 is advantageously formed from a material different than the stud 14 and base 28 and selected for ease of manufacturing and/or enhanced bonding compatibility with the substrate 12. The base 28 and footplate 24 are bonded and mechanically interlocked in a controlled production or laboratory environment to achieve a substantially optimum strength interconnection therebetween. The footplate 24 thereafter provides an extended underside surface 30 for compatible in-the-field high strength attachment to the substrate 12.

As shown best in FIGS. 2 and 3, the footplate 24 comprises a plurality of laminations or layers of composite material bonded together in sandwiching relation about the attachment base 28. Although any selected number of laminations may be used, the illustrative drawings depict three composite material laminations 31, 32, and 33 with the lowermost lamination 31 having a relatively large diameter and being positioned beneath the base 28. The middle and upper laminations 32 and 33 each include a central aperture 34 for placement over the stud 14 in stacked relation, with middle and upper laminations having progressively decreasing diametric size relative to the lowermost lamination 31. As shown in FIG. 2, the laminations desirably incorporate reinforcing fiber content of carbon-based fibers or the like, and the footplate strength is enhanced by orienting the fibers in the laminations 31 and 32 at right angles to each other and further by orienting the lamination 33 with its fibers set angularly with respect to the underlying lamination 32. An upper thrust washer 36 of metal or the like may be placed over the stud 14 above the upper lamination 33.

The above-described adhesive attachment 10 is placed into an appropriate die 38 shown in FIG. 3 for bonding together of the footplate laminations, the base 28, and the thrust washer 36. This bonding step occurs under controlled production conditions with controlled application, for example, of relatively high heat and pressure such as in an autoclave as depicted by arrows 39 to achieve substantially optimum bonding and mechanical interlocking between the footplate 24 and the base 28. Appropriate bonding agents or other adhesives may be interposed between the various surfaces as required to achieve a high strength connection. Importantly, the heat and pressure conditions utilized to form the footplate 24 will typically exceed the heat and pressure limits to which the substrate 12 can be subjected without degradation.

The thus-formed attachment 10 can be installed quickly and easily onto the substrate with substantially optimum bonding forces acting between the underside surface 30 of the footplate 24 and the substrate 12. The mounting fixture 18 to be described herein is preferably used in such installation of the adhesive attachment. The selected bonding agent 20 at the attachment/substrate interface 22 securely locks the threaded stud 14 or other attachment device with respect to the substrate 12, notwithstanding the formation of the stud 14 and its base 28 from a material which may be generally incompatible with high strength in-the-field mounting to the substrate. In the illustrative embodiment, as shown in FIGS. 1 and 4, the closed loop cable clamp 16 is fitted over the stud 14 and seated upon the thrust washer 36, with an additional washer 40 and lock-nut 42 being provided to secure the cable clamp 16 in place. In use, the cable clamp supports and guides a bundle 44 of electrical conductor wires or the like which may be connected between various electronic equipment, for example, within an aircraft. Alternately, other types of attachment devices can be used.

As shown in FIG. 5, in one alternative form of the invention, a modified thrust washer 46 can be used, with the remaining components of the attachment otherwise corresponding with the embodiment of FIGS. 1–4 and being referred to by common reference numerals. More specifically, the modified thrust washer 46 is substituted for the flat-sided thrust washer 36 depicted in FIG. 2. The modified thrust washer 46 includes a depending annular lip 48 which seats or crimps partially into the uppermost composite material lamination 33 for enhanced mechanical interlocking therewith. Accordingly, in this slightly modified version of the invention, the modified thrust washer 46 is both mechanically locked and bonded with the composite material footplate 24 to enhance the combined bonded/mechanically interlocked connection therebetween. When a nut (not shown in FIG. 5) is drawn down over the threaded stud 14, resultant compressive forces act upon the thrust washer 46 and further enhance the mechanical interlock between the base 28 and the footplate 24.

A further modified form of the adhesive attachment is referred to generally by the reference numeral 10' in FIGS. 6 and 7. In this version, the illustrative adhesive attachment comprises an attachment device in the form of an upstanding threaded stud 14' joined at its lower end to a modified base 28'. More particularly, the modified base 28' has a webbed configuration including a plurality of legs 29 contoured to merge smoothly with one another at the lower end of the stud 14' and radiating outwardly therefrom, with three of said legs 29 being shown in the illustrative drawings. For optimum mechanical interlock with an enlarged footplate 24' defined by multiple laminations of composite material, the upwardly presented surfaces of the legs 29 are smoothly contoured as viewed in FIG. 7. However, the lowermost surfaces of the legs 29 are generally flat and lie in a common plane generally in parallel with an underside surface 30' of the footplate 24'.

Still another modified version of the adhesive attachment of the present invention is shown in FIGS. 8–10. In this embodiment, the attachment device comprises an upstanding threaded stud 14" or the like joined at its lower end to a disk-shaped modified base 28" having a plurality of openings 50 formed therein. The modified base 28" is bonded and mechanically interlocked within an enlarged footplate 24" defined by sandwiching laminations of composite material. However, as shown best in FIG. 10, the openings in the base 28" accommodate direct bonded interconnection of the footplate laminations through the openings 50 for enhanced interlock between the footplate 24" and the base 28". This interlock interconnection can be enhanced still further by use of stitching 52 which may also be formed from a composite material. This stitching can be sewn through the composite material laminations to interconnect these laminations within each of the base openings 50 as noted by arrow 53 in FIG. 9, or such stitching may be sewn through the laminations and passed from one opening 50 to another, as depicted by arrows 54 in FIG. 9. Alternately, or in addition, the composite material laminations may be sewn together by additional stitching passed between the overlapping outer peripheries of the laminations at a position radially beyond the periphery of the base 28", as indicated by arrow 55 in FIG. 9.

The adhesive attachments of FIGS. 6–10 are advantageously constructed in generally the same manner as described with respect to FIGS. 1–4. More particularly, the threaded studs and their respective bases may be formed from any suitable material, including metal materials. The base is then secured under controlled production heat and/or pressure conditions to the footplate formed from the composite laminations. Upper washers may also be provided although not shown in FIGS. 6–10. The resultant adhesive attachment is thereafter applicable to a selected substrate formed from a composite material for high strength bonding attachment thereto.

Still further alternative adhesive attachment embodiments are shown in FIGS. 11–15 which depict attachment devices in the form of upstanding threaded studs secured directly to enlarged footplates formed as separate components. More specifically, with reference to FIGS. 11 and 12, an upstanding threaded stud 60 is formed from a conventional metal stud material and has conventionally rolled threads formed therein. The lower end of this stud 60 is connected directly to a disk-shaped footplate 62 formed as a separate component and optionally from a different material. For example, the footplate 62 may be constructed from sintered metal or the like into a geometry having a relatively thick central region tapering gradually to a reduced thickness outer periphery and defining a generally planar underside surface 64. In this regard, the footplate shape is more easily manufactured from sintered metal than sheet stock or as an integral component with the stud 60 and its thickness is designed to better match the mechanical characteristics of the substrate, such as the flexural characteristics or thermal coefficient of expansion, etc. A secure and permanent fusion joint interconnects the stud 60 and the footplate 62, wherein the fusion joint can be formed by arc welding, spin welding, diffusion bonding, or the like.

Figure 13:
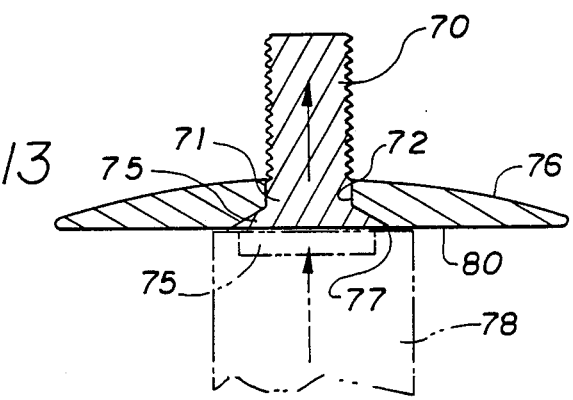
FIG. 13 is a vertical sectional view depicting a further modified form of the invention.

In a further modified form of the invention depicted in FIG. 13, an upstanding threaded stud 70 or the like includes formed threads over an upper region thereof. An unthreaded shoulder region 71 near the lower end of the stud is sized to fit with relatively close tolerance through a central opening 72 in an enlarged, disk-shaped footplate 76. A cap 75 at the stud lower end is partially receivable into a shallow cavity 77 on the underside of the footplate 76 and provides a stop to upward insertion of the stud 70 through the opening 72. Once inserted through the footplate opening, the lower stud cap 75 can be deformed by a staking hammer 78 or the like for secure mechanical connection to the footplate 76, whereupon the cap is deformed into and does not project beyond a generally planar underside surface 80 of the footplate 76. Conveniently, in this version, the footplate 76 can be constructed from any suitable material such as a composite material, sintered metal, and the like.

Figure 14:
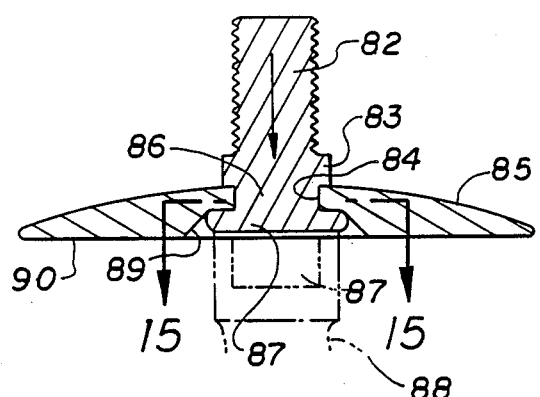
FIG. 14 is a vertical sectional view similar to FIG. 13 but depicting still another alternative form of the invention.
Figure 15:
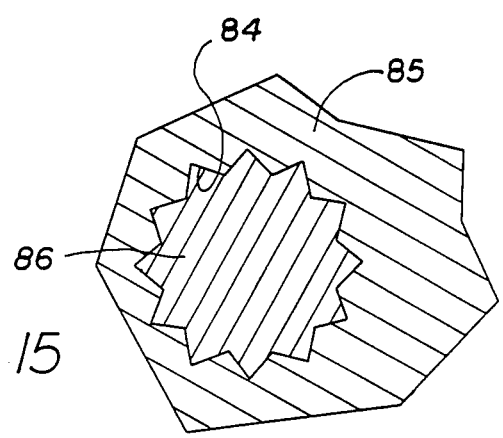
FIG. 15 is an enlarged fragmented horizontal sectional view taken generally on the line 15—15 of FIG. 14.

A further alternative form of the invention is shown in FIGS. 14 and 15, wherein an attachment device is provided in the form of a threaded stud 82 having an enlarged shoulder 83 near its lower end. The shoulder 83 is sized larger than a splined central opening 84 in a disk-shaped footplate 85 and thus provides a stop to downward insertion of a splined shank portion 86 into the footplate opening 84. Once inserted, a lower cap 87 on the studs is deformed by a peening hammer 88 or the like to seat within an underside recess 89 in the footplate, thereby locking the stud onto the footplate. Once again, the footplate 85 may be formed from any selected material such as sintered metal, composite materials or the like, and has a generally planar underside surface 90 for bonded engagement to a substrate.

The adhesive attachment embodiments of FIGS. 11–15, as described above, can be installed directly onto a substrate in the same manner as described with respect to the embodiment of FIGS. 1–4. Alternately, if desired, the attachments of FIGS. 11–15 can be assembled with a larger footplate formed from composite material laminations as shown in FIGS. 1–4 for secure mounting onto a substrate of composite material.

The improved mounting fixture 18 is shown in one preferred form in FIGS. 16–20. As shown, this mounting fixture 18 comprises a normally dished spring plate 92 having a central opening 94 for receiving a threaded stud 14 or other projection on an adhesive attachment of the type described, for example, in FIGS. 1–15. The spring plate 92, which is preferably formed from a lightweight molded plastic or the like as a one-piece component, is joined at its periphery to one axial end of an annular outer ring 96 which is connected in turn at its opposite axial end to an outwardly radiating annular connector rim 98. One face of this connector rim 98 is presented toward the substrate 12 and is lined with an adhesive material preferably such as a pressure sensitive adhesive material 100 which may be protectively covered prior to use by a peel-off release paper (not shown). Importantly, as viewed in FIG. 17, the underside surface 30 of the adhesive attachment footplate 24 is coated with a selected bonding agent 20 is normally positioned by the spring plate 92 in a plane advanced toward the substrate beyond the plane of the connector rim 98.

The mounting fixture 18 and associated adhesive attachment 10 are installed quickly and easily onto the substrate 12 by the installation tool 26. More specifically, the tool 26 has a tubular forward end sized for reception of the ring 96 of the mounting fixture 18 and for engaging the axial face of the connector rim 98 opposite the adhesive layer 100. The installation tool 26 is advanced toward the substrate 12 in the direction of arrows 102 is FIG. 17 with the underside surface 30 of the footplate 24 leading relative to the adhesive layer 100. The attachment footplate 24 thus lands on the substrate prior to the connector rim 98 while installation tool advancement toward the substrate continues. As a result, the spring plate 92 is deflected until the connector rim 98 is secured at least temporarily to the substrate 12 by means of the pressure sensitive adhesive 100. This displaces the spring plate 92 from an initial unstressed position to a secondary stressed position wherein the spring plate applies a positive force pressing the attachment toward the substrate, as depicted by arrows 104 in FIG. 18. In this manner, the bonding agent at the attachment/substrate interface is forced intimately into the interstices of the structures at the interface with a uniform force applied across the interface throughout a cure period thereby achieving a substantially optimum bonding strength. After curing of the bonding agent, the mounting fixture 18 may be stripped from the substrate leaving the attachment in place bonded onto the substrate.

If desired, the installation tool 26 may be adapted for use with various types of bonding agents. For example, as viewed in FIG. 19, the bonding agent 20 at the attachment/substrate interface may comprise a hot melt or thermoset adhesive material. In this case, the installation tool 26 may include a heating element 110 connected, for example, to the metal stud 14 for applying heat energy input thereto as depicted by arrows 112. The stud conducts the input heat downwardly to the attachment/substrate interface to activate the hot melt bonding agent prior to installation tool withdrawal.

As viewed in FIG. 20, the amount of the bonding agent 20 applied to the attachment/substrate interface may be varied to insure permanent mounting fixture attachment to the substrate for some specialized applications. For example, an excess of the bonding agent 20 can be applied to the attachment/substrate interface to insure radially outward extrusion of a bead 20' of the bonding agent into an annular space between the attachment footplate 24 and the radially inner diameter surface of the mounting fixture connector ring 96. When cured, the bonding agent bead 20' securely bonds the mounting fixture 18 to the attachment footplate 24 and thereby maintains the mounting fixture in a position to protect and shield the attachment footplate. If desired, the mounting fixture may be constructed from a suitable material designed to seal the attachment/substrate interface against undesired outgassing from attachment components.

Still other alternative bonding agent compositions can be used, with the installation tool 26 being adapted for facilitated mounting of the adhesive attachment and activation of the bonding agent. For example, as viewed in FIGS. 21 and 22, encapsulated beads 114 of bonding agent may be applied to the underside surface 30 of the attachment footplate 24, wherein such bonding agent is activated for curing by rupturing of the beads for exposure of the bonding agent to air and/or moisture within the air. Alternatively, as viewed in FIGS. 22 and 23, discrete beads 116 and 118 of different bonding agent compositions may be applied to the underside of the footplate 24, wherein intermixing of the two components initiates a curing process.

The bonding agents shown in FIGS. 21–23 may be activated by modification of the installation tool 26 to insure bead rupture or component intermixing incident to attachment placement upon a substrate 12. For example, as viewed in FIG. 24, the installation tool 26 may include vibratory means such as an ultrasonic vibratory head 120 for connection to the attachment 10 as by connection to the threaded stud 14 or other appropriate structure. The attachment footplate 24 is thus vibrated at an ultrasonic frequency as it is moved by the installation tool into landed contact upon the substrate, thereby activating the bonding agent of the underside surface thereof. Alternatively, as viewed in FIG. 25, the installation tool 26 may be provided with rotational means such as a rotary head 122 secured to the attachment stud 14 or other structure for rotation of the attachment after landing upon the substrate. The attachment is rotated through a sufficient angular displacement to rupture and/or intermix the bonding agent to initiate activation of bonding agent curing.

The improved adhesive attachments and mounting fixtures and related methods of use of the present invention thus provide optimum bonding engagement of the adhesive attachments with a wide range of substrates including but not limited to specialized substrate materials. The invention is particularly useful for secure connection of an adhesive attachment onto substrates of composite materials by providing an attachment footplate secured to a metal stud or the like in a controlled production environment and then mounted in-the-field onto the substrate with heat and/or pressure conditions which can be tolerated by the composite material substrate. Moreover, the improved mounting fixture provides a simplified apparatus for rapid attachment installation while providing a positive forced urging the attachment into intimate engagement with the supporting substrate.

A variety of further modifications and improvements to the invention described herein are believed to be apparent to those skilled in the art. Accordingly, no limitation on the invention is intended by way of the description and drawings, except as set forth in the appended claims.

What is claimed is:

1. A mounting fixture for mounting an adhesive attachment onto a substrate, comprising:

spring means for supporting the adhesive attachment, said spring means being normally in a first position and movable to a second position; and connector means carrying said spring means and having means for at least temporary connection of said connector means to the substrate, said connector means carrying said spring means in said first position with the attachment oriented to land upon the substrate prior to said connector means upon movement thereof toward the substrate, said spring means being movable to said second position upon further movement of said connector means toward the substrate to land said connector means thereon;

said spring means applying a positive force when in said second position pressing the attachment toward the substrate.

2. The mounting fixture of claim 1 wherein said spring means comprises a central spring plate, an outer connection member carrying said spring plate, and a connector rim on said connection member, and further including adhesive means for at least temporarily connecting said rim to the substrate.

3. The mounting fixture of claim 2 wherein said spring plate, connector member, and rim are formed as a one-piece component.

4. The mounting fixture of claim 3 wherein said one-piece component is formed from molded plastic.

5. The mounting fixture of claim 2 wherein said spring plate is dished centrally in a direction toward the substrate when said spring plate is in said first position.

6. The mounting fixture of claim 1 wherein said means for at least temporary connection of said connector means to the substrate comprises a pressure-sensitive adhesive.

7. The mounting fixture of claim 1 further including an installation tool for placing said mounting fixture while supporting the adhesive attachment onto the substrate, said installation tool including means for

* * * * *

UNITED STATES PATENT AND TRADEMARK OFFICE
CERTIFICATE OF CORRECTION

PATENT NO. : 4,842,912

DATED : June 27, 1989

INVENTOR(S) : Charles G. Hutter, III

It is certified that error appears in the above-identified patent and that said Letters Patent is hereby corrected as shown below:

In the drawings, sheet 3, insert the legend "FIG. 19" referring to the drawing figure which appears immediately below FIG. 18.

On the title page, the state of residence for both the inventor and Assignee should be changed from "Nebr." to --Nevada--.

At column 12, line 38, after "for", insert --moving said connector means into at least temporary connection with the substrate and for concurrently permitting displacement of said spring means from said first position to said second position.--

Signed and Sealed this

Eighth Day of May, 1990

Attest:

HARRY F. MANBECK, JR.

*Attesting Officer*  *Commissioner of Patents and Trademarks*